(12) United States Patent
Martin

(10) Patent No.: US 11,849,416 B1
(45) Date of Patent: Dec. 19, 2023

(54) METHODS AND SYSTEMS FOR COORDINATING NODES IN A MESH NETWORK

(71) Applicant: Synapse Wireless, Inc., Huntsville, AL (US)

(72) Inventor: Jon Martin, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 1 day.

(21) Appl. No.: 17/538,172

(22) Filed: Nov. 30, 2021

(51) Int. Cl.
*H04W 56/00* (2009.01)
*H04J 3/06* (2006.01)

(52) U.S. Cl.
CPC ....... *H04W 56/0015* (2013.01); *H04J 3/0658* (2013.01); *H04W 56/0065* (2013.01)

(58) Field of Classification Search
CPC .......... H04W 56/0015; H04W 56/0065; H04J 3/0658
USPC ........................................................ 370/350
See application file for complete search history.

(56) References Cited

U.S. PATENT DOCUMENTS

| | | | |
|---|---|---|---|
| 11,057,748 B1 | 7/2021 | Zoller | |
| 11,658,798 B1* | 5/2023 | Kratz | H04L 7/041 |
| | | | 375/368 |
| 2002/0136339 A1* | 9/2002 | Schulz | H04B 7/185 |
| | | | 375/326 |
| 2004/0141526 A1* | 7/2004 | Balasubramanian | H04J 3/0667 |
| | | | 370/503 |
| 2009/0135854 A1* | 5/2009 | Betti | H04J 3/0632 |
| | | | 370/503 |
| 2014/0301513 A1* | 10/2014 | Takahashi | H04J 3/0697 |
| | | | 375/354 |
| 2014/0365435 A1 | 12/2014 | Alexander et al. | |
| 2015/0229422 A1 | 8/2015 | Guagenti et al. | |
| 2015/0271772 A1* | 9/2015 | Knowles | H04W 56/0015 |
| | | | 370/350 |
| 2016/0366642 A1 | 12/2016 | Singh et al. | |
| 2017/0195980 A1* | 7/2017 | Aggarwal | H04W 56/005 |
| 2018/0027587 A1 | 1/2018 | Qiao et al. | |
| 2021/0288737 A1* | 9/2021 | Prince | H04J 3/0644 |
| 2021/0337498 A1* | 10/2021 | Lee | H04J 3/0664 |

(Continued)

OTHER PUBLICATIONS

Synchronization of Pulse-Coupled Biological Oscillator; SIAM Journal on Applied Mathematics, vol. 50, No. 6. (Dec. 1990), pp. 1645-1662; Renato E. Mirolla et al.

*Primary Examiner* — Robert J Lopata
(74) *Attorney, Agent, or Firm* — Butler Snow LLP; Jon E. Holland

(57) ABSTRACT

The present disclosure generally pertains to systems and methods for synchronizing nodes in a mesh network. A system in some embodiments may comprise a node having a counter that is incremented using a non-linear counting function. The node may be incremented using the function at intervals as measured by an internal oscillator of the node. The counter may also be incremented by a fixed amount when receiving a sync-packet from neighboring nodes. The non-linear counting function effectively smooths out the variability of the internal oscillator while the synchronization packet acts to keep the value of the counter synchronized with the value of the counters of neighboring nodes. This allows nodes in a mesh network to be synchronized for certain events while avoiding the issues of other synchronization techniques.

11 Claims, 6 Drawing Sheets

(56) References Cited

U.S. PATENT DOCUMENTS

2021/0385771 A1   12/2021  Hui et al.
2023/0236624 A1*  7/2023   Levi .................... H04J 3/0682
                                                     713/400

* cited by examiner

METHODS AND SYSTEMS FOR COORDINATING NODES IN A MESH NETWORK

TECHNICAL FIELD

The present disclosure generally relates to mesh networks, and more particularly, methods, systems, and non-transitory computer readable media for synchronizing the timing of nodes in a mesh network.

RELATED ART

Mesh networks are increasingly used for a variety of applications and reasons. Indeed, mesh networks are fairly robust and less complex than many other types of networks and also are capable of operating with very low power requirements, making them particularly attractive for implementing wireless sensor networks that may be used to monitor various types of equipment and devices dispersed across a geographic region. Although mesh networks are capable of operating asynchronously, it is often useful for the nodes in a mesh network to have their timing (e.g., have their clocks or internal timers) synchronized. For example, it can be useful to enable nodes to coordinate sleep states to conserve battery life or to distribute frames among nodes in a time-division multiplexing scheme. Unfortunately, coordinating the timing of nodes in a mesh network is challenging particularly as the network grows. Existing methods often have a wide timing drift or consume a large amount of the bandwidth of the mesh network to coordinate the nodes. The latter being particularly problematic since the bandwidth of mesh networks is often comparatively limited as the network grows and becomes more congested. Thus, better ways of synchronizing the timing of nodes in a mesh network are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for synchronizing nodes in a mesh network. More precisely, the systems of the present disclosure may be useful for maintaining synchronized timing of functions by nodes in a mesh network without a significant consumption of resources. In particular, these systems can account for the relatively looser tolerance thresholds for the internal oscillators or other timing mechanisms used in many nodes. By using a counter that is incremented at intervals using a non-linear counting function and which resets when a threshold is reached, nodes may maintain a relative measure of the time since the counter was last reset. The non-linear counting function takes into account the current value of the counter, with the function yielding smaller increment amounts as the current value of the counter increases. That is, the function's count rate non-linearly decreases as the count value increases.

Further, each node sends a sync packet to its immediate neighbors whenever it resets its counter, and each node receiving a sync packet increments its counter by a fixed amount in response to the sync packet. Because the counter adjustment is fixed and the count rate is non-linear, these sync packets affect the timing of nodes whose counter is about to reset more than they affect the timing of nodes whose counter has just recently reset. Over several iterations, this results in the nodes synchronizing the timing of their counter resets. That is, the nodes quickly converge to sending their sync packets at the same time. Thus, this system results in the nodes being synchronized despite the drift in their internal oscillators without consuming a significant amount of resources.

Figure 1:
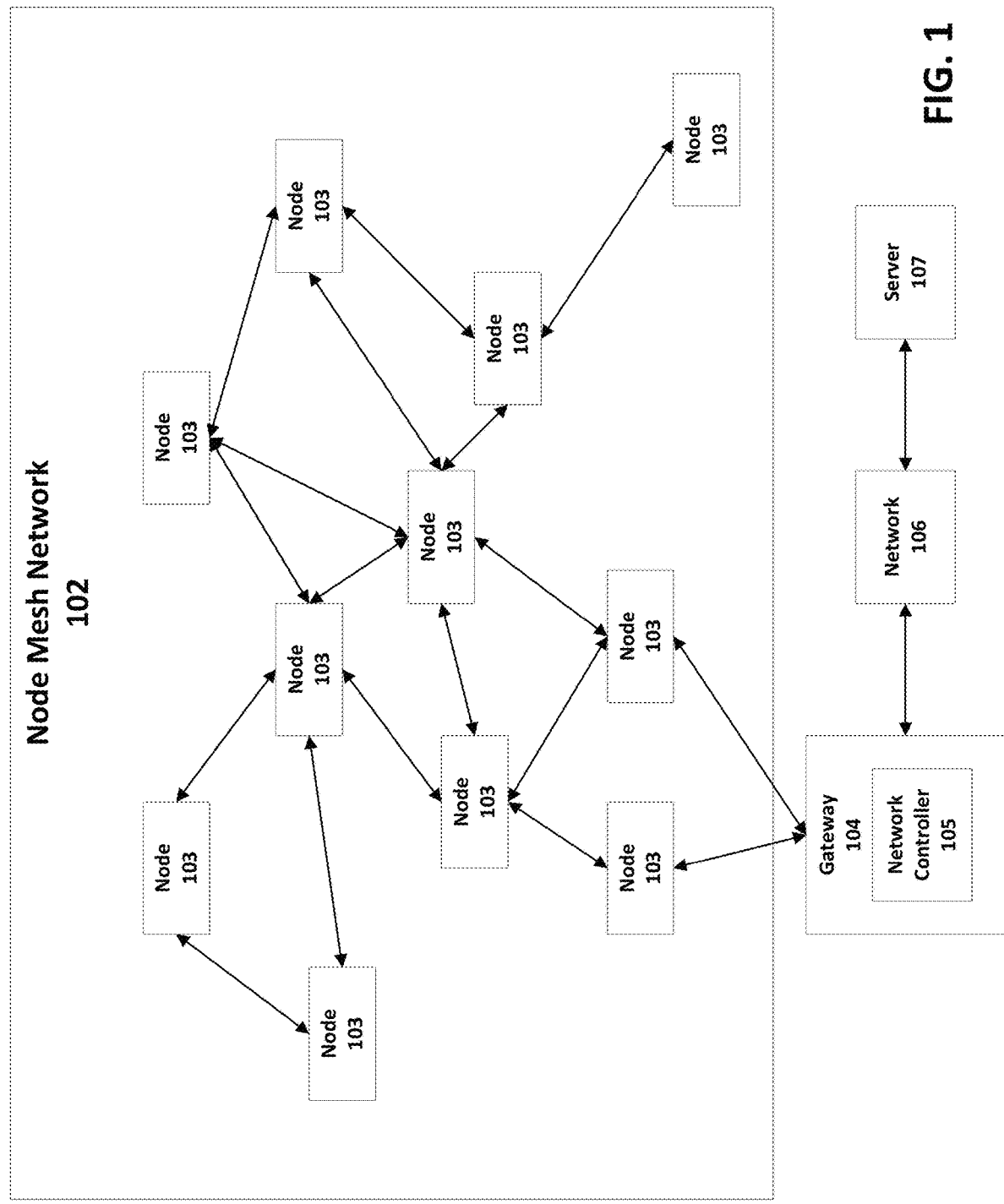
FIG. 1 is a block diagram of an exemplary mesh network and supporting devices.

FIG. 1 shows a diagram of a mesh network of nodes in accordance with an exemplary embodiment of the present disclosure. As shown by the figure, a mesh network 102 may comprise plurality of nodes 103. Generally speaking, these nodes could be performing a variety of functions, such as measuring parameters of their environment (e.g. measuring ambient temperature) and controlling other devices (e.g., lighting), etc. To communicate with one another, the nodes may transmit information through a wireless protocol.

Two nodes within direct communication range of one another are referred to as neighboring nodes. For a source node to communicate with nodes that are not a neighbor, the source node can pass its message to one or more intermediate nodes such that the message hops from node-to-node through the network until it reaches the message's destination node. Whether two or more nodes are in direct communication range of one another (i.e., whether they are neighbors) can depend on a variety of factors, such as the nodes' transmitter strength, the node's receiver characteristics, the interference present on the nodes' communication channel, the layout and composition of the nodes' physical environment, and the like.

In general, nodes may also communicate with a server 107, which could be used to record information from the nodes 103 or to manage the nodes 103. To communicate with the server 107, some nodes 103 in the mesh network 102 can connect with a gateway 104. The gateway 104 can communicate with the nodes 103 using one protocol and can communicate over a network 106 using a second protocol. Internally, the gateway 104 may convert messages from the nodes 103 into a form suitable for transmission over network 106. Similarly, the gateway 104 may convert messages from the network 106 into a form suitable for transmission (to a node 103) through the node mesh network 102. Exemplary techniques for communicating in a mesh network are described by commonly-assigned U.S. Pat. No. 9,619,989, entitled "Asset Tracking Systems and Methods" and issued on Apr. 11, 2017, which is incorporated herein by reference.

Like with most electronics, the nodes 103 have an internal sense of timing. This allows them to perform various functions on a schedule. For many cases, having the timing of each node 103 coordinated (e.g., synchronized with one another) is desirable. For example, having coordinated timing may be desired to allow some nodes 103 to enter a sleep state without fragmenting the mesh network 102. Coordinated timing is also important for use of a time-division multiplexing scheme, which can be used to avoid nodes 103 from interfering with one another by transmitting on the same channel at the same time. Other uses of coordinated timing between nodes are possible in other embodiments.

Unfortunately, highly accurate clocks are often expensive and consume a significant amount of power, and lower-cost clocks selected for use by nodes of many networks are often vulnerable to drift, making synchronization between the nodes problematic. As a result of drift, the nodes 103 must periodically have their timing re-synchronized to ensure that the timings of the nodes 103 do not deviate from one another beyond a certain tolerance. This can be a complicated endeavor, particularly for the many use cases where the mesh network 102 is large, either in terms of the number of nodes 103 in the node mesh network 102 or in terms of the physical spread of the nodes 103.

While methods exist to ensure synchronization between devices, these methods often are optimized for more traditional networks. In other words, existing synchronization methods do not account for the particular challenges of mesh networks. In particular, these challenges often include low computing power, limited battery-life, limited bandwidth, and often (relatively) inaccurate internal timer. Because of this mismatch, existing methods often fail to reliably work for mesh networks, particularly large mesh networks. Moreover, to the extent these methods do work (e.g., keep the nodes in a mesh network synchronized with a certain tolerance) they usually consume an inordinate amount of resources, unduly draining the battery-life of the nodes 103 or consuming a large amount of the available bandwidth of the mesh network to send a large number of coordinating messages between nodes 103.

To better address these issues, nodes in accordance with embodiments of the present disclosure utilize a non-linear counter to track time. This counter is configured to decrease its count rate as the counter value approached a reset threshold. When the counter of a given node is reset, the node transmits a packet, referred to herein as a "synchronization packet" or "sync packet" to notify its neighboring nodes of the reset. In response, the neighboring nodes that hear the sync packet, if any, adjust (e.g., increase) the timing of their respective counters by a predefined amount. For the nodes having counters that are close to resetting, the predefined adjustment has a greater effect on timing than the nodes having counters that just recently reset, due to the non-linear nature of the counting function. Thus, over time, the timing of the nodes converge such that the counters reset at about the same time, thereby maintaining synchronization. Not only can this synchronization be achieved with components that are low cost and consume a relatively low amount of power, but synchronization can be achieved with relatively low adverse effect on network congestion.

Figure 2:
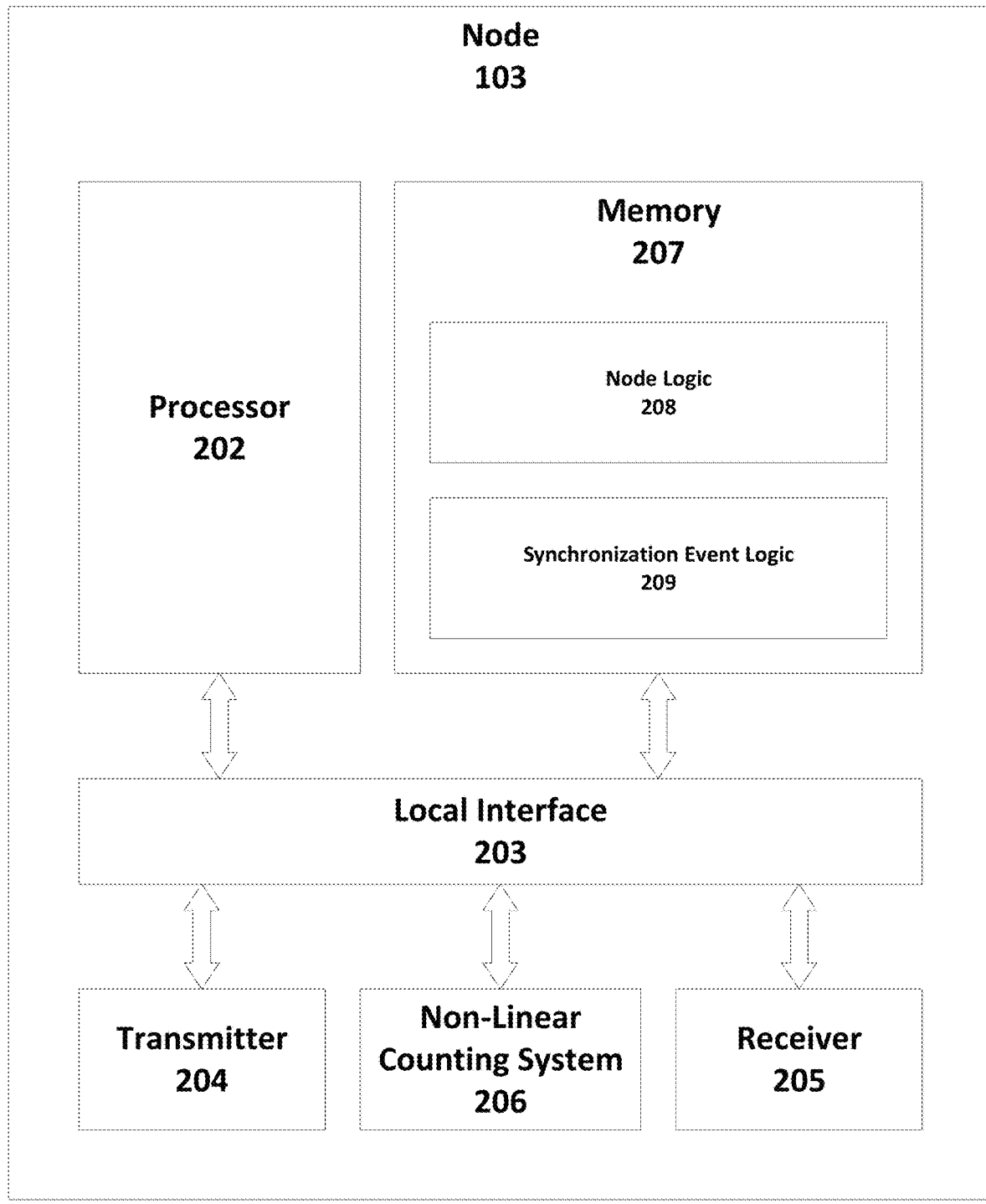
FIG. 2 is a block diagram of an exemplary node, such as is depicted by FIG. 1.

FIG. 2 shows a diagram of a node in accordance with an exemplary embodiment of the present disclosure. As shown by FIG. 2, a node 103 may have at least one processor 202, a transmitter 204, a receiver 205, a non-linear counting system 206, and a memory 207. These components (along with possibly other components of the node 103) may be connected to one another through a local interface 203. The processor 202 may be a general purpose device capable of performing various operations. The memory 207 may be a memory device capable of storing digital data. The receiver 205 may be capable of receiving data, such as packets from other nodes. The processor 202 may retrieve this data (either directly from the receiver 205 or indirectly from the memory 207 after the data is stored) for processing. Relatedly, the transmitter 204 may be capable of transmitting data, such as packets to other nearby nodes. The processor 202 may generate or otherwise provide this data and send it to the transmitter 204 for transmission. Lastly, the non-linear counting system 206 may be used as a timing source that the processor 202 may use to control the timing of certain events (e.g., a synchronization event, as described below).

In the exemplary embodiment shown by FIG. 2, part of the data stored in the memory 207 is node logic 208. The node logic 208 may include data and instructions for generally controlling the operation of the node 103. Additionally, part of the data stored in the memory 207 may include synchronization event logic 209, which may detail one or more procedures that occur based on the value stored in the non-linear counting system 206 (such as it reaching a threshold value).

In operation, the non-linear counting system 206 may store a value which it periodically updates according to an internal timing signal (e.g., an oscillator). In particular, the non-linear counting system 206 may update the stored value according to a non-linear counting function, with the non-linear counting function taking into account the current stored value. In addition, the processor 202 may receive a sync packet from a neighboring node via the transmitter 204. In response to receiving the sync packet, the processor 202 may interact with the non-linear counting system 206 to have the non-linear counting system 206 update its stored value by a fixed amount.

Figure 6:
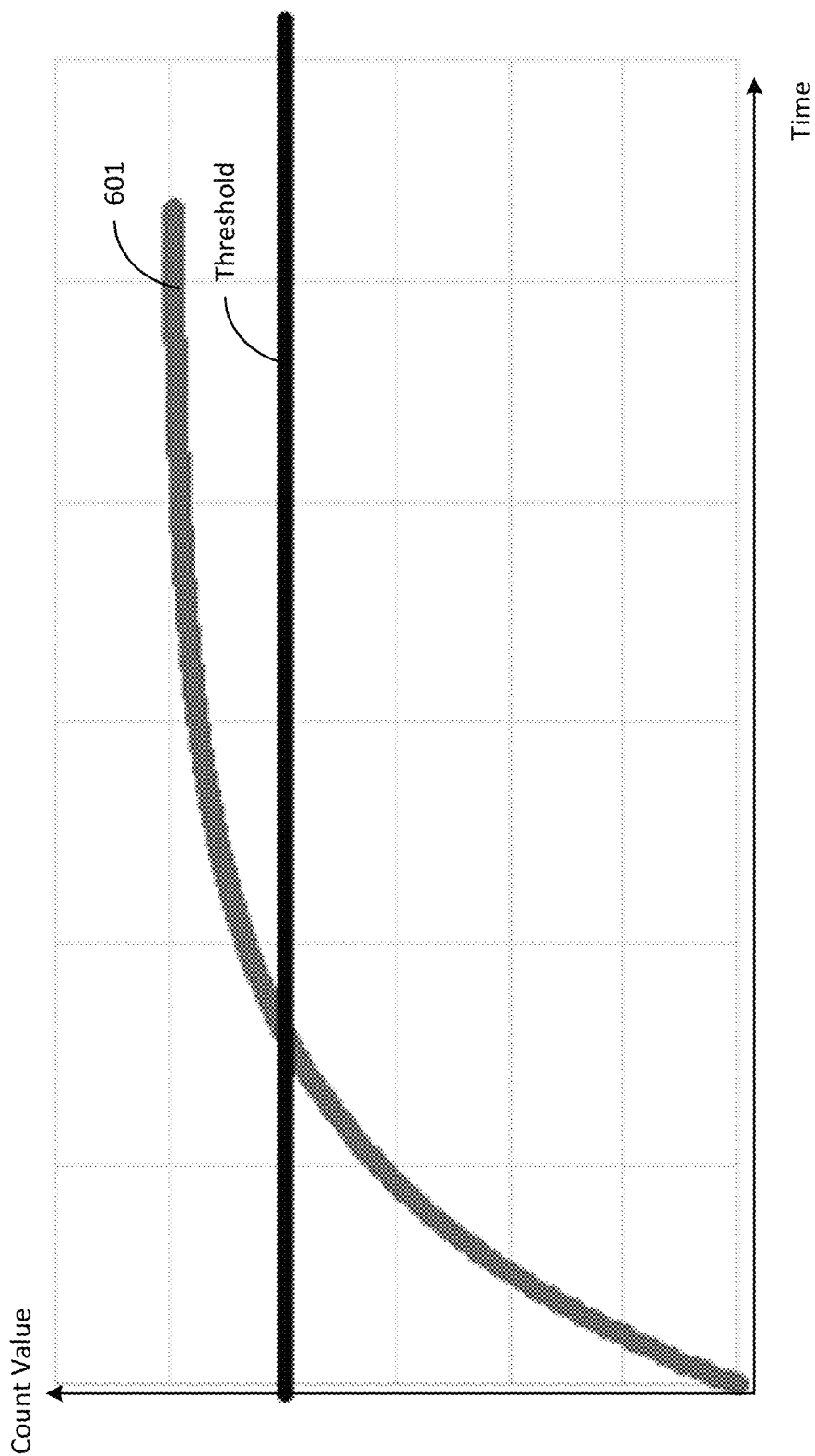
FIG. 6 is graph showing count value versus time for a non-linear counting function.

FIG. 6 is a graph showing count value (represented by curve 601) versus time for a non-linear counting function. As shown by the figure, the magnitude of a stored value (y-axis) increases over time (x-axis) but at an increasingly slower rate. In other words, the count rate of the stored value decreases as the magnitude of the stored value increases. This also means that the count rate of the stored value decrease over time, at least until the stored value is reset. For illustrative purposes FIG. 6 shows a graph of the count value for a non-linear function over time assuming that a reset does not occur at the threshold (TH). However, as noted further below, the count value may actually be reset once the threshold is reached.

In parallel, with the activity of the non-linear counting system 206, the processor 202 may, in some embodiments, periodically interact with the non-linear counting system 206 to determine its stored value. The processor 202 may compare the stored value to an event threshold and take action if the stored value from the non-linear counting system 206 has reached the event threshold. Alternatively, in some embodiments, the non-linear counting system 206 may itself periodically compare its stored value to an event threshold. If the stored value from the non-linear counting system 206 has reached the event threshold, the non-linear counting system 206 may interact with the processor 202 to cause the processor 202 to take action.

In either case, if the stored value from the non-linear counting system 206 has reached the event threshold, the processor 202 may send a sync packet to any neighboring nodes using the transmitter 204. The processor 202 may execute one or more procedures indicated by the synchronization event logic 209. Finally, the stored value in the non-linear counting system 206 may be reset to a reset value. In some embodiments, this may be the result of the processor 202 interacting with the non-linear counting system 206 in response to determining that the stored value has reached the event threshold, causing the non-linear counting system 206 to reset its stored value to the reset value. In other embodiments, this may be the result of the non-linear counting system 206 determining that its stored value has reached the event threshold, causing the non-linear counting system 206 to reset its stored value to the reset value.

Figure 3:
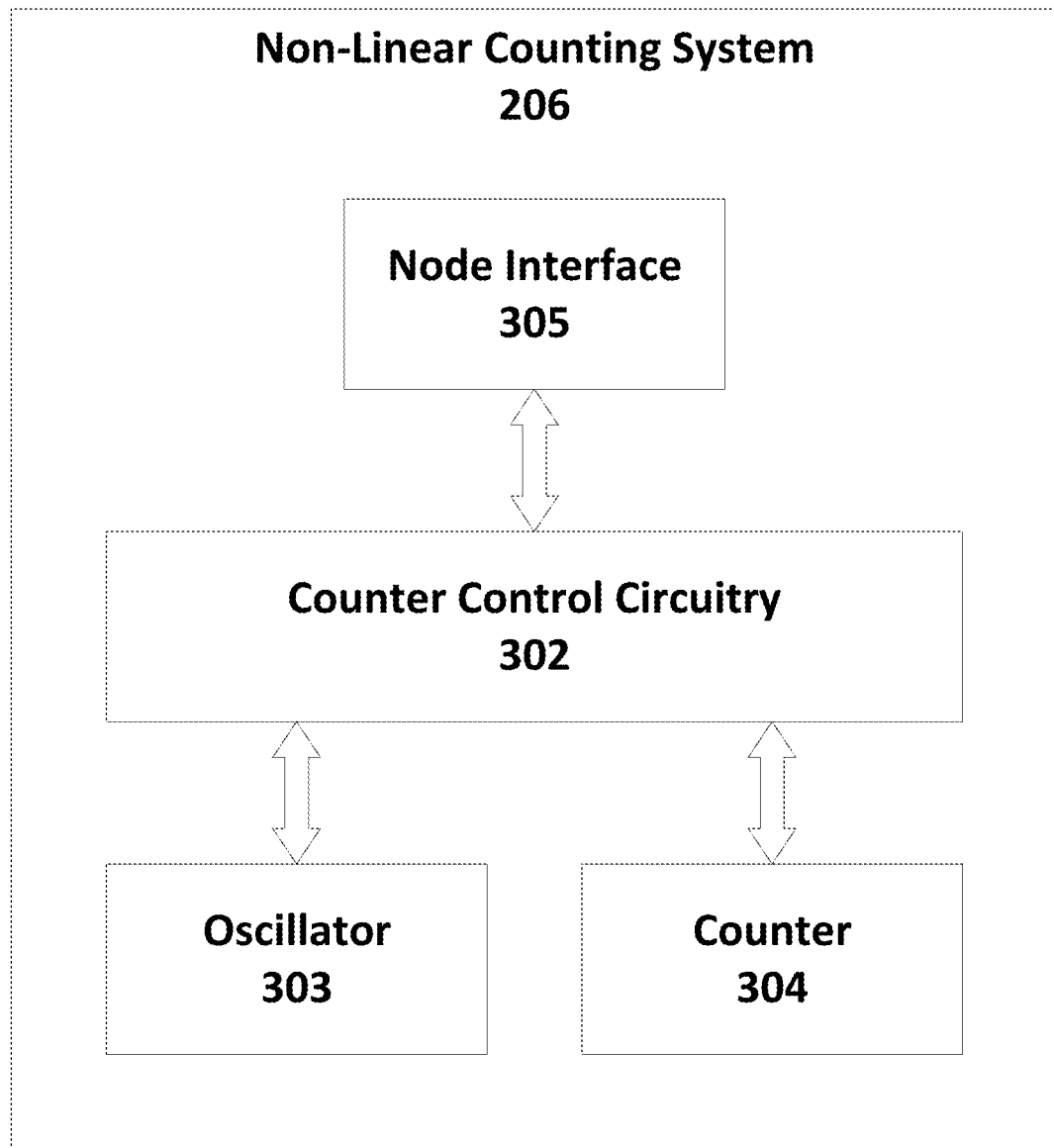
FIG. 3 is a block diagram of an exemplary non-linear counting system, such as is depicted by FIG. 2.

FIG. 3 shows a diagram of a non-linear counting system 206 in accordance with an exemplary embodiment of the present disclosure. As shown by FIG. 3, a non-linear counting system 206 may comprise counter control circuitry 302, an oscillator 303, a counter 304, and a node interface 305. The counter control circuitry 302 may be connected to and able to interact with the oscillator 303, the counter 304, and the node interface 305. In general, the counter control circuitry 302 may be general purpose circuitry configured to interact with the components of the non-linear counting system 206 to implement a non-linear counting function as described above. To achieve this function, the oscillator 303 may be configured to generate a periodic pulse (with some level of uncertainty) that the counter control circuitry 302 may use to control the timing of certain events. The counter 304 may be configured to store a number (which could be of various types, such as an integer, a floating-point number, or the like). The counter 304 may be mutable, such that the number can be changed (e.g., incremented). The node interface 305 may be configured to allow the counter control circuitry 302 to communicate and interact with other components of the node 103, such as the node's processor 202.

In operation, the counter control circuitry 302 may operate to increment the value stored in the counter 304 at intervals dictated by the oscillator 303 (e.g., once every number of pulses from the oscillator 303). The counter control circuitry 302 may increment the counter 304 using a non-linear counting function encoded into the counter control circuitry 302, with the non-linear counting function taking into account the current value stored in the counter 304. Additionally, the counter control circuitry 302 may also increment the counter 304 in response to the node's processor 202 indicating to the counter control circuitry 302 that a sync packet from a neighboring node has been received. In particular, the counter control circuitry 302 may increment the counter 304 with a fixed amount encoded into the counter control circuitry 302.

Additionally, as described above, the counter control circuitry 302 may occasionally monitor the value in the counter 304 to determine if its value has reached a set event threshold. If it has, the counter control circuitry 302 may interact with the node's processor 202 to indicate that the set event threshold has been met. The counter control circuitry 302 may also reset the counter 304 to a reset value. Alternatively, the node's processor 202 may occasionally interact with the counter control circuitry 302 (via the node interface 305) to determine the current value stored in the counter 304. The processor 202 of the node 103 may use this value to determine if the set event threshold has been met. If it has, the processor 202 may, among other things, interact with the counter control circuitry 302 (via the node interface 305) to cause the counter control circuitry 302 to reset the counter 304 to the reset value.

Note that, while described here as circuitry, the non-linear counting system 206 and its various components may be implemented in hardware or a combination of hardware and software. As an example, the counter control circuitry 302 may comprise one or more field programmable gate arrays (FPGAs) or one or more application-specific integrated circuits (ASICs). In some embodiments, the counter control circuitry 302 may comprise one or more processors (e.g., central processing units (CPUs) or microprocessors), such as the processor 202 of a node 103, programmed with software that when executed by the processor cause the processor to perform the functions described herein for the counter control circuitry 302. In other embodiments, other configurations of the counter control circuitry 302 are possible.

Figure 4:
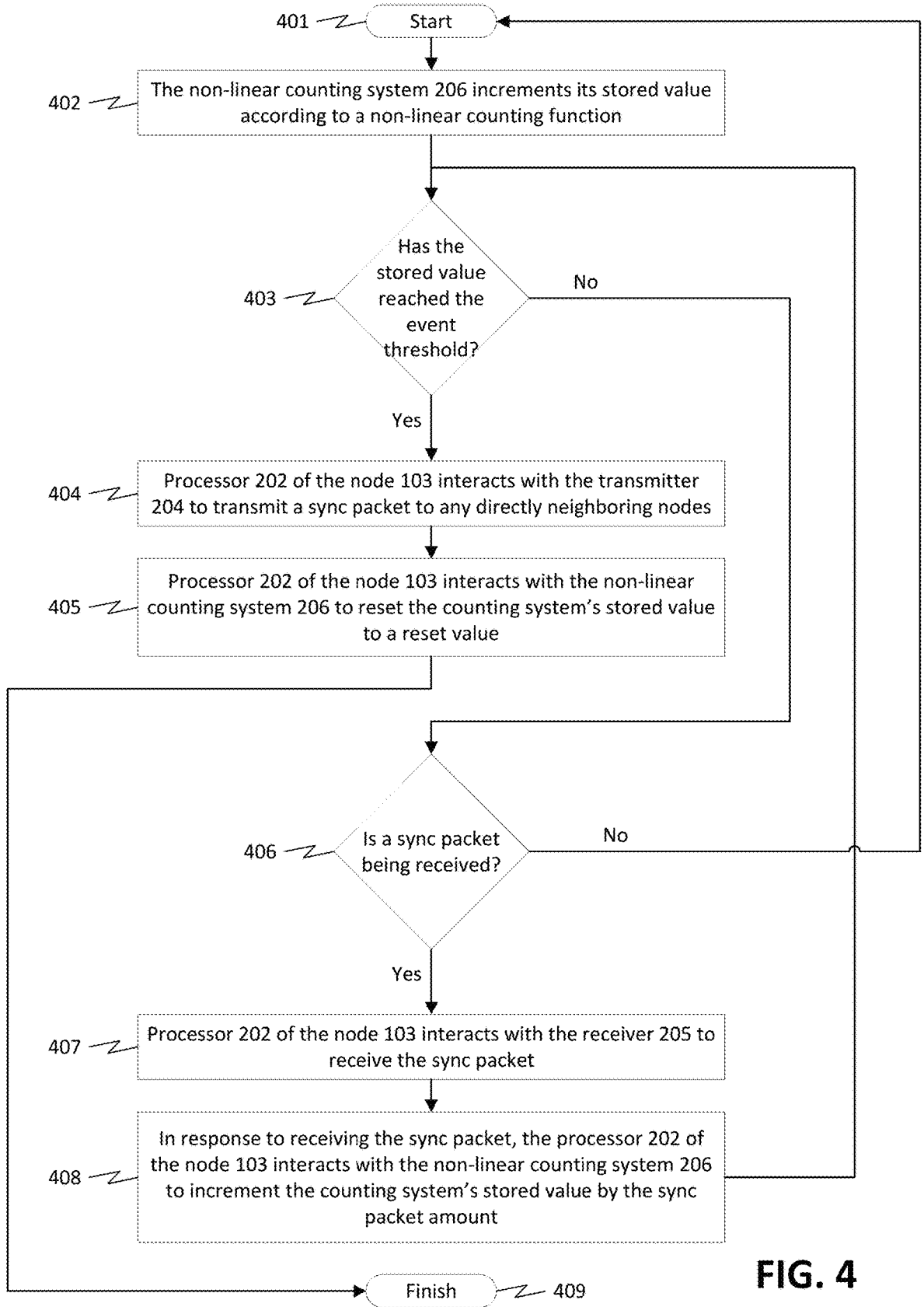
FIG. 4 is a flowchart of an exemplary method of coordinating the timing of a node in a mesh network.

FIG. 4 is a flowchart illustrating the process of controlling the timing of a node in a mesh network, as just described. To start, as shown by block 402 of FIG. 4, the non-linear counting system 206 may increment a stored value according to a non-linear counting function. In other words, the value stored in the non-linear counting system 206 (e.g., in the counter 304) is periodically incremented according to a non-linear counting function, with the counting period indicating the time between each successive iteration.

At some point, as shown by block 403 of FIG. 4, the value stored in the non-linear counting system 206 may be compared to an event threshold value. As mentioned previously, the event threshold amount indicates a value that, when exceeded by the value stored in the non-linear counting system 206, results in the stored value being reset, along with other events, as described below. To assess the value stored in the non-linear counting system 206, the processor 202 may occasionally interact with the non-linear counting system 206 to ascertain its currently stored value. The processor 202 may then compare this value even threshold value to determine when the event threshold is exceeded. Alternatively, the non-linear counting system 206 may itself compare its stored value to the event threshold and, if the stored value exceeds it, alter the processor 202. What triggers the processor 202 or the non-linear counting system 206 to evaluate the stored value may vary. For example, in one exemplary embodiment, the processor 202 or non-linear counting system 206 may evaluate the value of the stored value whenever the stored value is incremented.

If the non-linear counting system's stored value has reached the event threshold amount, as shown by block 404 of FIG. 4, the processor 202, based on instructions contained in the node logic 208, may use transmitter 204 to transmit a sync packet to any directly neighboring nodes. More precisely, the node logic 208 may cause the processor 202 to generate a sync packet (i.e., may create the data stream indicating a sync packet in the form dictated by the protocol being used) and transmit the sync packet using the transmitter 204. Unlike some other data packets sent by the processor 202, which may indicate a certain intended recipient or group of recipients (e.g., a certain node or server), the sync packet may be intended for any neighboring nodes (and only the neighboring nodes). In other words, the neighboring nodes, upon receiving a sync packet, do not retransmit the sync packet. Instead, the receiving nodes act on the sync packet and then discard it. Specifically, in response to receiving the sync packet, the node's counter control circuitry may increment its stored value by a fixed amount (i.e., by an amount not dependent on the current stored value of the receiving node's non-linear counting system), referred to herein as the "sync-packet amount." In some embodiments, each sync packet is a one-hop multicast message having a time-to-live value that is set such that the message is not retransmitted by the neighboring nodes that receive it. In other embodiments, other types of messages may be used.

Importantly, as also described further below, if a neighboring node that would otherwise receive the first sync packet transmitted by the node 103 happens to, itself, be transmitting a second sync packet, the neighboring node may not receive (or, alternatively, simply may not respond to) the first sync packet. In other words, a node 103 may ignore an incoming sync packet when it itself is transmitting a sync packet. The duration of a node's non-responsiveness to sync packets is called the sync packet overlook duration. This may be achieved by communication limitations (e.g., the node 103 cannot transmit and receive simultaneously) or by configuring the nodes to ignore successfully received messages. Thus, in some embodiments the node 103 may ignore sync packets for a duration longer than the literal time taken to transmit a sync packet. For example, for a duration starting when the non-linear counting system's stored value is determined to have reached the event threshold and ending when any synchronization events are completed. Alternatively, the duration may start when the non-linear counting system's stored value is determined to have reached a certain threshold (e.g., the event threshold or slightly before the event threshold) and end a certain amount of time afterwards (e.g., 500 milliseconds later). As an example, the sync packet overlook duration may be centered on the time that event threshold is reached, though other times of the sync packet overlook duration are possible.

After transmitting the sync packet to any directly neighboring nodes, as shown by block 405 of FIG. 4, the processor 202, based on instructions contained in the node logic 208, may interact with the non-linear counting system 206 to cause the non-linear counting system's stored value to be reset to a reset value. In other words, the process is reset, with the non-linear counting system 206 again incrementing its stored value until it reaches the event threshold amount. In an exemplary embodiment, the reset value is the same as the value that the non-linear counting system's stored value is initialized to at the beginning of the process. A natural choice for the reset value is zero, but other values may be used in some embodiments.

At some point, as shown by block 406 of FIG. 4, the node 103 (in particular, the processor 202 of the node 103) may receive a sync packet through receiver 205 from a neighboring node. Specifically, at some point a neighboring node may have its counter reached the event threshold amount and, as described by block 404 of FIG. 4, may transmit a sync packet. Note that, as previously mentioned, a node 103 only receives sync-packets from its neighbors, since the nodes 103 do not forward sync packets and, by definition, a first nodes neighbors are the nodes that the first node can communicate with directly.

If the node 103 is receiving a sync packet, as shown by block 407 of FIG. 4, the processor 202 may interact with the receiver 205 to receive the sync packet. Once it is received, the processor 202 may process the sync packet as described below in block 408 of FIG. 4. Note that, as previously mentioned, a node 103 (and in particular, a processor 202 of a node 103) may not respond to a sync packet when it itself is sending a sync packet.

After the node 103 has received a sync packet, as shown by block 408 of FIG. 4, the processor 202 may interact with the non-linear counting system 206 to cause the non-linear counting system 206 to increment its stored value by a predefined amount, referred to herein as the "sync-packet amount." Unlike the non-linear counting function, the sync-packet amount is fixed and does not depend on the current stored value in the non-linear counting system 206. In one exemplary embodiment, the value of the sync-packet amount may depend on the event threshold. The greater the sync-packet amount relative to the event threshold value, the greater the relative impact on a node's timing (and the lesser the relative impact of a node's oscillator on the node's timing) when receiving a sync packet.

Figure 5:
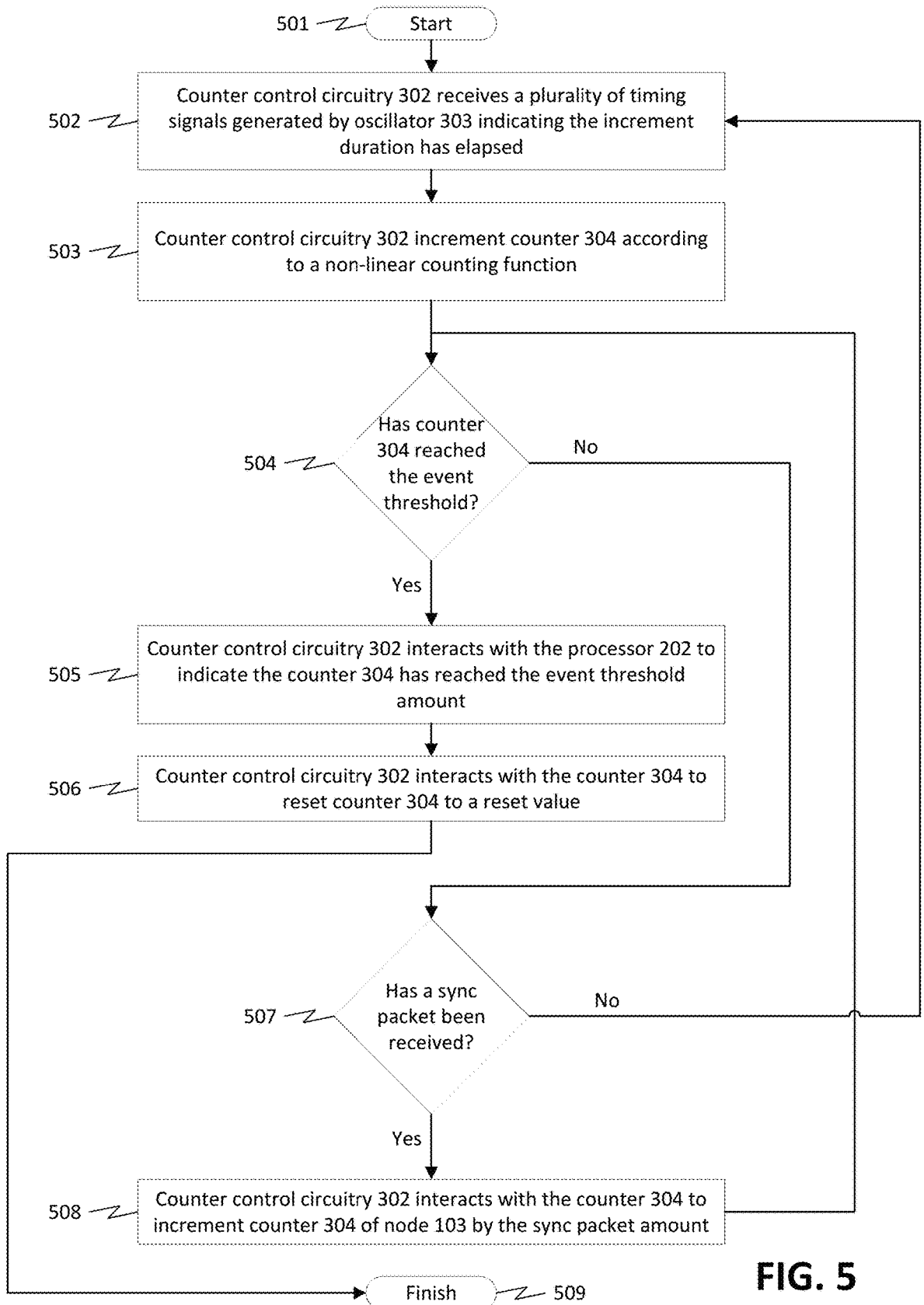
FIG. 5 is a flowchart illustrating the operation of a non-linear counting system.

FIG. 5 is a flowchart illustrating the operation of a non-linear counting system 206. To start, as shown by block 502 of FIG. 5, the counter control circuitry 302 may receive a plurality of timing signals generated by the oscillator 303 which indicate that an increment duration has elapsed. In operation the oscillator 303 may operate by generating an electronic clock signal with a (nominal) frequency (i.e., with a (nominal) period). Because the nominal frequency of the oscillator is known, the counter control circuitry 302 may use the number of timing signals to estimate the passage of time (e.g., the number of seconds). However, the actual frequency (and period) of the signal may vary over time and stray from the nominal frequency (and nominal period) up to a certain tolerance. In other words, the frequency of the signal may be any value within a certain tolerance interval, with the average value being the nominal frequency. Thus, the actual amount of time represented by a certain number of timing signals may vary based on the drift of the timing signal within its tolerance.

The timing information as measured using the oscillator 303 may be used to determine when the increment duration has elapsed. For example, the configuration of the counter control circuitry 302 may indicate that the increment duration for the counter 304 is every 100 milliseconds. Based on the number of timing signals generated by the oscillator and its known frequency, the counter control circuitry 302 may periodically determine if a relevant number of timing signals have been generated (or, equivalently, if a measure derived from these timing signals, such as a system clock, has reached a relevant value).

In response to the increment duration elapsing, as shown by block 503 of FIG. 5, the counter control circuitry 302 may increment counter 304 according to a non-linear counting function. Conceptually, the value stored in the counter 304 acts as clock measuring the passage of time since the last time the event threshold was met, with the non-linear counting function acting as a "tick" indicating that more time has passed (i.e., by incrementing the value in the counter). The timing is relative because the non-linear counting function, as suggested by its name, does not increment the counter 304 by the same value every time (despite the function being run at consistent (within the tolerance of the oscillator) intervals). Rather, the amount that the counter 304 is incremented (e.g., the amount that the relative time is advanced) depends on the current value of the counter 304. The larger the value stored in the counter 304 (e.g., the more relative time has passed since the counter 304 was reset) the less the non-linear function increments the counter 304 for the current "tick." Thus, the rate of increase in the counter's value, also referred to herein as the "count rate," is non-linearly reduced over time as the counter value increases until the counter 304 is reset at which time the count rate is re-initialized.

The non-linearity of the non-linear counting function (i.e., the fact that the counter 304 is measuring relative time) does not impede using the counter 304 to synchronize the nodes 103 because each of these nodes 103 (specifically, the non-linear counting system 206 of each of the nodes 103) is also using the same non-linear counting function. In other words, because the non-linear counting system 206 also increment their counters 304 in the same manner, the value of the counters stay consistent with one another (within the drift allowed by the tolerance of their respective oscillators). Since the goal is to synchronize the counter's timing with one another (as opposed to some outside device) this relative synchronization is sufficient.

The specifics of the non-linear counting function may depend on the specifics of mesh network 102, the parameters of the nodes 103, and the like. For example, for a counter 304 starting at 0, with an event threshold value of m, an increment duration of d, and a desired counter period of p, a function ƒ(v), where v is the current value of the counter 304, could be $$f(v) = \frac{p}{d + d * v^{1.5}}.$$

By incrementing the value stored in the counter 304 according to this function, the counter is gradually incremented less and less at every increment duration, until it is reset.

At some point, as shown by block 504 of FIG. 4, the value stored in the counter 304 may be assessed to determine whether it has reached the event threshold amount. As previously mentioned, to assess the value stored in the non-linear counting system 206, the processor 202 may, in some embodiments, occasionally interact with the non-linear counting system (via the node interface 305) to ascertain the current value stored in the counter 304. The processor 202 may then compare this value even threshold value to determine when the event threshold is exceeded. Alternatively, the counter control circuitry 302 may itself compare the value stored in the counter 304 to the event threshold to determine when the event threshold is exceeded. What triggers the processor 202 or the non-linear counting system 206 to evaluate the stored value may vary. For example, in one exemplary embodiment, the processor 202 or non-linear counting system 206 may evaluate the value stored in the counter 304 whenever the counter 304 is incremented.

If the value stored in the counter 304 has reached the event threshold amount, as shown by block 505 of FIG. 5, the counter control circuitry 302 may interact (through the node interface 305) with the processor 202 to alert the processor 202 that the counter 304 has reached the event threshold amount. This may trigger the processor 202 to execute one or more synchronization events.

Additionally, if the value stored in the counter 304 has reached the event threshold amount, as shown by block 506 of FIG. 5, the counter control circuitry 302 may interact with the counter 304 to reset the value stored in the counter 304 to a reset value. In other words, the process is reset, with the non-linear counting system 206 again incrementing the value stored in the counter 304 until its stored value reaches the event threshold amount, triggering another synchronization event.

At some point, as shown by block 507 of FIG. 5, the node 103 may receive a sync packet from a neighboring node. In response to receiving a sync packet, the processor 208 may interact with the counter control circuitry 302 (through the node interface 305) to indicate that a sync packet has been received.

In response to being notified that a sync packet has been received, as shown by block 508 of FIG. 5, the counter control circuitry 203 may increment counter 304 by the sync-packet amount. As mentioned above, unlike the non-linear counting function, the sync-packet amount is fixed and does not depend on the current value of the counter 304. In one exemplary embodiment, the value of the sync-packet amount may depend on the event threshold of the counter 304.

As a result of each node 103 in the mesh network 102 following the method described by FIG. 4, the nodes 103 (in particular, the counters 304 of the non-linear counting systems 206 of the nodes 103) tend to become synchronized with one another. More precisely, the timing of when the counters 304 meet the event threshold tends to become synchronized. In this regard, when a given node 103 successfully receives a sync packet from a neighbor such that a counter adjustment is to be performed, it means that the receiving node's counter 304 has significantly drifted relative to the sending node's counter 304.

Indeed, if the counters 304 of the two nodes are closely synchronized, then the counters 304 will reach the event threshold at about the same time such that each node 103 will trigger a reset of the counter 304 and a transmission of a sync packet. Since the two nodes 103 transmit their sync packets at about the same time, the two sync packets will likely collide such that neither node 103 successfully receives the sync packet transmitted by the other node 103 or each node 103 receives the sync packet during the node's sync packet overlook duration such that neither node 103 responds to the sync packet of the other node 103. In either case, the counters 304 are not adjusted in response to the sync packets since the counters 304 are sufficiently synchronized within a desired tolerance. Thus, successfully receiving a sync packet from a neighbor outside of the sync packet overlook duration occurs when the counters 304 of the two nodes 103 have sufficiently drifted such that an adjustment of the timing maintained by the counters 304 is desirable.

The non-liner nature of the counting function causes nodes 103 receiving a sync packet outside of their respective sync packet overlook duration to adjust their timing differently depending on whether node 103 is "ahead" of or "behind" the neighboring node 103 that transmitted the sync packet, referred to hereafter as the "transmitting node." In this context, "ahead" means that the receiving node 103 has recently triggered (i.e., the counter 304 of the transmitting node 103 has recently reached the event threshold and reset) just before the time of reception of the sync packet from the transmitting node 103 while "behind" means that the receiving node 103 is about to trigger (i.e., the value of the counter 304 is close to but still below the event threshold) at the time of reception of the sync packet from the transmitting node 103.

Irrespective of whether a receiving node 103 is ahead or behind of the transmitting node 103, the receiving node adjusts (e.g., increases) the timing of its counter 304 by the sync-packet amount. However, the relative effect of this adjustment does differ between a receiving node 103 depending on whether it is ahead or behind the transmitting node 103. In particular, the effect on the timing of the receiving node 103 relative to the timing of the transmitting node 103 differs depending on whether the receiving node 103 is ahead of or behind the transmitting node 103. If the receiving node 103 is behind the transmitting node 103 (and assuming the counter control circuitry 203 positively increments the counter 304 when a sync-packet is received), the adjustment to the receiving node's counter 304 reduces the difference in timing between the receiving node 103 and the transmitting node 103. In contrast, if the receiving node 103 is ahead of the transmitting node 103 (and assuming the counter control circuitry 203 positively increments the counter 304 when a sync-packet is received), the adjustment to the receiving node's counter 304 increases the difference in timing between the receiving node 103 and the transmitting node 103.

Notably, however, the relative magnitude of the change in the timing difference between the receiving node 103 and the transmitting node 103 also depends on whether the receiving node 103 is ahead or behind the transmitting node 103. In particular, if the receiving node 103 is behind the transmitting node 103, the magnitude of the change in the timing difference the receiving node 103 and the transmitting node 103 is greater than the magnitude of the change in the timing difference when the receiving node 103 is ahead of the transmitting node 103. In other words, the overall effect of a sync packet from a transmitting node 103 on its neighbors (e.g., the one or more receiving nodes 103) is to bring the timing of "behind" receiving nodes 103 more into alignment with the transmitting node 103 and the timing of "ahead" receiving nodes 103 are pushed out of alignment. Over several iterations, this asymmetry gradually results in the timing of the nodes converging, since each sync-packet brings the receiving nodes 103 more into alignment than it pushes them out of alignment.

Mechanistically, the asymmetry of the effect a sync-packet (depending on whether a receiving node 103 is "ahead of" or "behind" a transmitting node 103) results from the non-linear nature of the nodes' counting rates. Specifically, since the count rate of the receiving node's counter decreases as the counter value approaches the event threshold, the predefined adjustment to the counter value will affect the timing of a node behind the transmitting node 103 to a greater extent than the timing of a node ahead of the transmitting node 103. Thus, the effect of the predefined adjustment on all of the neighboring nodes 103 successfully receiving the sync packet from the transmitting node 103 is that the timing of the neighboring nodes 103 behind the transmitting node 103 will be boosted more than the timing of the neighboring nodes 103 that are "ahead" of the transmitting node 103. Thus, the timing of each "behind" neighboring node 103 is brought closer to the timing of the transmitting node 103 than the neighboring nodes that are "ahead." Over several iterations, this results in all of the nodes 103 converging on triggering at around the same time, with a slight difference depending on the length of the window for the sync packet overlook duration.

Note that, as indicated above, it is unnecessary for the nodes 103 to be configured to ignore messages within a sync packet overlook duration. In this regard, the nodes 103 may be configured to perform a counter adjustment, as described above, whenever a sync packet is successfully received from any neighbor. As noted above, when the counters 304 of a group of neighbors are synchronized, they will attempt to send sync packets at about the same time such that the sync packets will collide, thereby preventing any of the group of neighbors from successfully receiving the sync packets. That is, a sync packet will only be received or heard when the timing of at least one node has significantly drifted from the timing of the other nodes in the group.

It should also be noted that the synchronization techniques described above enable synchronization to reliably occur without consuming significant power or significantly contributing to network congestion. In this regard, the synchronization techniques involve the repetitive transmission of sync packets, but these packets are generally transmitted in bursts in a manner such that, by design, many of the messages are transmitted at about the same time and collide on the network. Thus, the duration that network congestion is impacted by the transmissions of these sync packets is relatively short.

The absolute timing difference between any two nodes in a mesh network partially depends on the diameter (e.g., the length of the longest path (in hops) from the set containing the lengths of the shortest length paths connecting each pair of nodes in the mesh network). The greater the diameter, the greater the absolute drift possible between the maximally distant nodes. The reason for this is that each node in a hop may drift from its neighbor by a sync packet overlook duration before being re-synchronized. In the worst case, each node on the longest path may have the maximum amount of drift permitted by the sync packet overlook duration from its neighbors (in the same direction), causing, in the worst case, drift that is linear to the number of separating nodes. However, this is the worst case scenario and, in practice, even the maximally distant nodes in a mesh network have a tighter synchronization. In part, this is because the topology the mesh network typically introduces redundancy that avoids this scenario. Additionally, the drift of the nodes are rarely correlated to be in the same direction and, in fact, would tend to cancel out to some degree (i.e., some nodes have drifted ahead while some have drifted behind).

Empirically, for larger mesh networks, nodes quickly converge into groups of synchronized nodes (typically around two to three hops of one another, on average), with these groups then converging into one larger synchronized group. For sufficiently large mesh networks, this pattern may repeat fractally. Because of this pattern, the convergence time of a mesh network tends to grow sub-linearly with the number of nodes (i.e., grows more slowly relative to the growth of the number of nodes).

Once the initial convergence period of a mesh network is completed, the nodes can randomly skip transmitting sync packets, which can help save power in the battery-powered nodes. While this can add a slight delay in the detection of timing slippage, it may be an acceptable trade for certain applications.

Now, therefore, the following is claimed:

1. A node of a wireless mesh network, comprising:
   a wireless communication interface having a transmitter and a receiver;
   an oscillator configured to generate a clock signal;
   a counter configured to store a count value; and
   control circuitry configured to:
      increment, based on the clock signal, the stored count value by using a non-linear counting function having a count rate based on the stored count value, wherein the count rate of the non-linear counting function decreases non-linearly as the stored count value is incremented and approaches an event threshold;
      increment the stored count value by a predefined amount in response to a synchronization packet being received from a neighboring node of the wireless mesh network;
      compare the stored count value to the event threshold; and
      based on the comparison of the stored count value to the event threshold amount:
         reset the stored count value to a reset value; and
         transmit a synchronization packet to at least one neighboring node of the wireless mesh network.

2. A node of a wireless mesh network, comprising:
   a transmitter;
   a receiver;
   an oscillator configured to generate a clock signal;
   a counter configured to store a count value; and
   control circuitry configured to increment the stored count value based on the clock signal, wherein a count rate for the stored count value is non-linear based on the stored count value, the control circuitry further configured to adjust the stored count value by a predefined amount in response to a synchronization packet received from a neighboring node of the wireless mesh network.

3. The node of claim 2, wherein the control circuitry is further configured to compare the stored count value to an event threshold and reset the stored count value based on comparison of the stored count value to the event threshold amount, and wherein the control circuitry is configured to transmit a synchronization packet to at least one neighboring node of the wireless mesh network in response to a reset of the stored count value.

4. A wireless mesh network, comprising:
a first node having a first counter for storing a first count value, the first node configured to increment the stored first count value based on a first clock signal, wherein a count rate for the stored first count value is non-linear based on the stored first count value, the first node further configured to transmit a first synchronization packet based on the first count value; and
a second node having a second counter for storing a second count value, the second node configured to increment the stored second count value based on a second clock signal, wherein a count rate for the stored second count value is non-linear based on the stored second count value, the second further configured to adjust the stored second count value by a predefined amount in response to the first synchronization packet.

5. The wireless mesh network of claim 4, wherein the first node is configured to transmit the first synchronization packet based on a comparison of the stored first count value to a first threshold.

6. The wireless mesh network of claim 5, wherein the first node is configured to reset the stored first count value based on a comparison of the stored first count value to the first threshold.

7. The wireless mesh network of claim 5, wherein the second node is configured to transmit a second synchronization packet based on a comparison of the second stored count value to a second threshold.

8. The wireless mesh network of claim 7, wherein the first node is configured to reset the stored first count value based on a comparison of the stored first count value to the first threshold, and wherein the second node is configured to reset the stored second count value based on a comparison of the stored second count value to the second threshold.

9. A method for coordinating a timing of a node of a wireless mesh network, comprising:
incrementing, based on a clock signal, a stored count value by using a non-linear counting function having a count rate based on the stored count value, wherein the count rate of the non-linear counting function decreases non-linearly as the stored count value is incremented and approaches an event threshold;
incrementing the stored count value by a predefined amount in response to a synchronization packet being received from a neighboring node of the wireless mesh network;
comparing the stored count value to the event threshold; and
based on the comparison of the stored count value to the event threshold:
resetting the stored count value to a reset value; and
transmitting a synchronization packet to at least one neighboring node of the wireless mesh network.

10. A method for coordinating a timing of a node of a wireless mesh network, comprising:
generating a clock signal at the node of the wireless mesh network;
storing a count value in a counter of the node;
incrementing the stored count value based on the clock signal, wherein a count rate for the stored count value is non-linear based on the stored count value;
receiving a synchronization packet from a neighboring node of the wireless mesh network; and
adjusting the stored count value by a predefined amount in response to the synchronization packet received from the neighboring node of the wireless mesh network.

11. The method of claim 10, further comprising:
comparing the stored count value to an event threshold;
resetting the stored count value based on the comparing; and
transmitting a synchronization packet from the node to at least one neighboring node of the wireless mesh network in response to the resetting.

* * * * *